Sept. 11, 1928.

R. E. DE WALT 1,683,763

DRILL OR MORTISING MACHINE

Filed Sept. 17, 1925          2 Sheets-Sheet 1

INVENTOR
Raymond E. De Walt
BY
Frank J. Kent
ATTORNEY

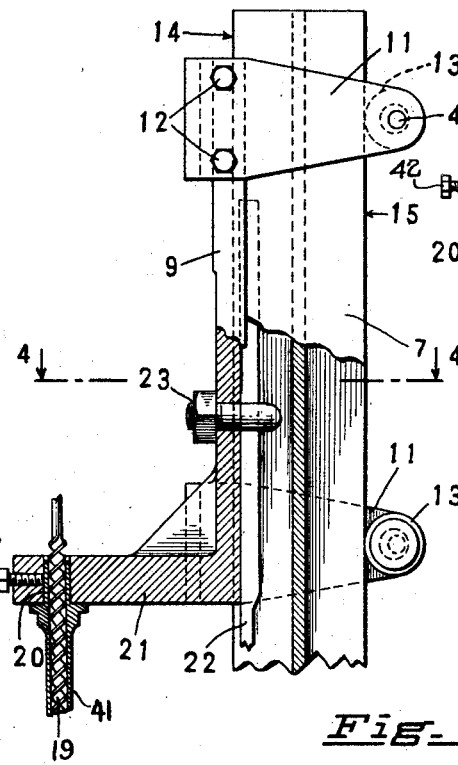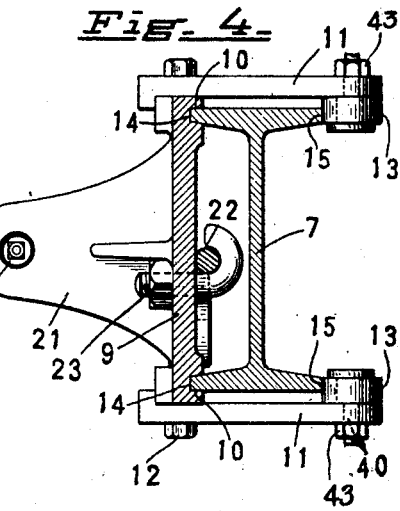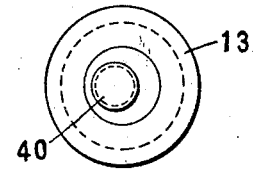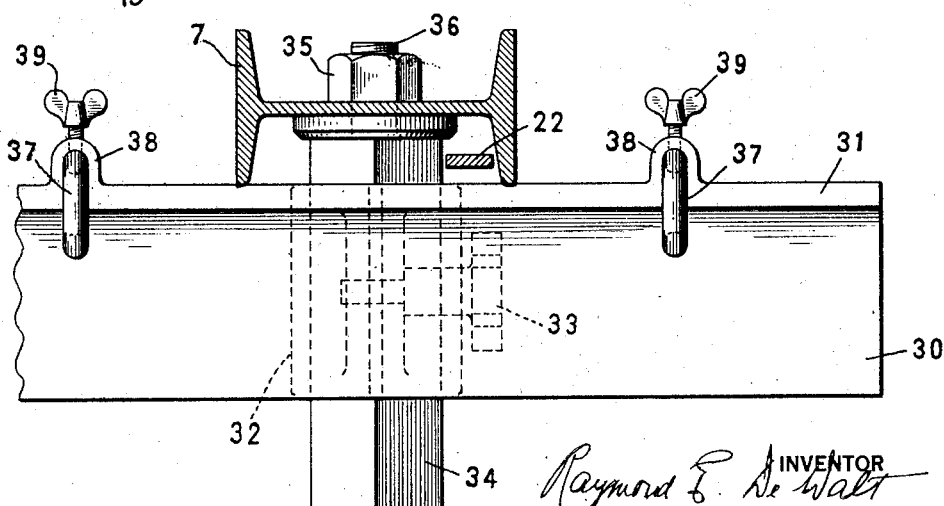

Patented Sept. 11, 1928.

1,683,763

UNITED STATES PATENT OFFICE.

RAYMOND E. DE WALT, OF LEOLA, PENNSYLVANIA.

DRILL OR MORTISING MACHINE.

Application filed September 17, 1925. Serial No. 56,823.

The present invention relates particularly to mortising machines of the hollow chisel type and the objects of the invention are to provide a machine of this type which will be of relatively simple and inexpensive construction, practical and efficient for the purposes intended, adjustable to meet various requirements and adapted to many uses.

These and other desirable objects are attained by certain novel features of construction, combinations and relations of parts as set forth in the following specification and claims.

The drawings accompanying and forming part of this specification illustrate the invention embodied in one of its commercial forms, but it is to be understood that the structure may be modified without departure from the broad spirit and scope of the invention.

Figure 3 is an enlarged part sectional broken detail of the drill carriage.

Figure 4 is a horizontal section of the same as on substantially the plane of line 4—4 of Figure 3.

Figure 5 is a detached detail view of one of the eccentrically mounted carriage guiding rollers.

Figure 6 is a cross sectional view as on substantially the plane of line 6—6 of Figure 1, showing particularly the work table or support.

Figure 1:
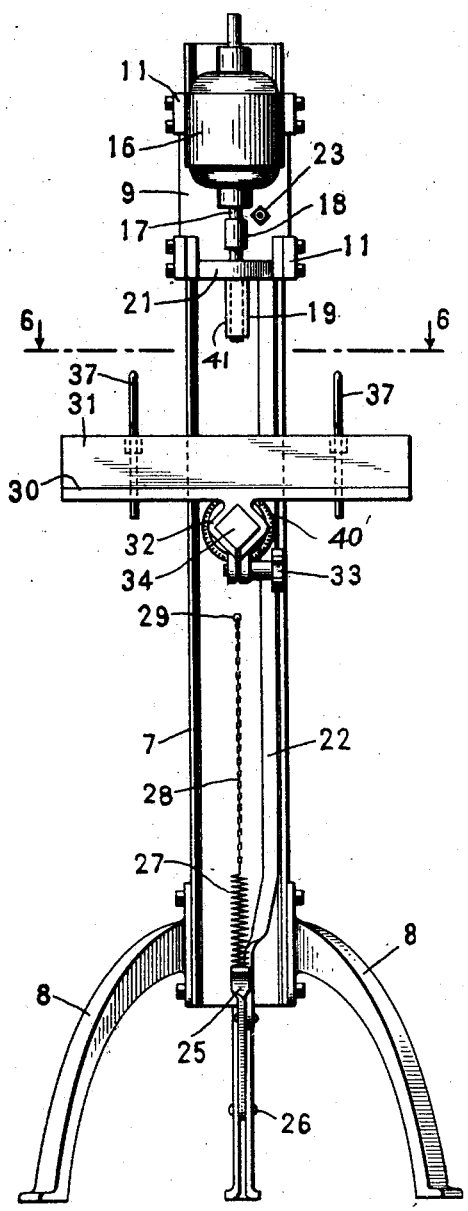
Figure 1 is a front elevation of the invention as embodied in the form of a drill press.

One of the special features of the invention is that the frame for the machine is made from a length of structural I-beam 7 supported upright on a suitable stand such as the tripod legs 8.

Sliding over the front flanges of this I-beam column is a carriage 9 shown in Figure 4 as grooved at 10 to receive the edges of the flanges, the carriage being confined in this relation by rearwardly extending brackets 11 detachably bolted thereto at 12 and carrying at the rear, rollers 13, riding on the rear flanges. The edges of the front flanges 14 and rear flanges 15 may be faced off to remove any burs and make them absolutely true and smooth, as indicated at Figures 2 and 4.

A motor 16 is shown mounted on the upper portion of the carriage having an upright spindle 17 carrying a chuck 18 for the stem of the drill 19. The hollow chisel 41 is held against rotation in the forwardly projecting lug or arm 21 at the lower end of the carriage by set screw 42.

The drill carriage is reciprocated vertically on the supporting standard by a link 22 disposed within the front channel of the I-beam structure and extending up in back of the sliding carriage, the upper end of link 22 being rounded and adjustably connected with said carriage by a hook bolt 23 and pivotally connected at its lower end at 24 with a pedal 25 which is pivoted at 26 to the rear leg of the tripod stand and is supported in elevated position by a spring 27 connected by a chain 28 to the web of the I-beam at 29.

Figure 2:
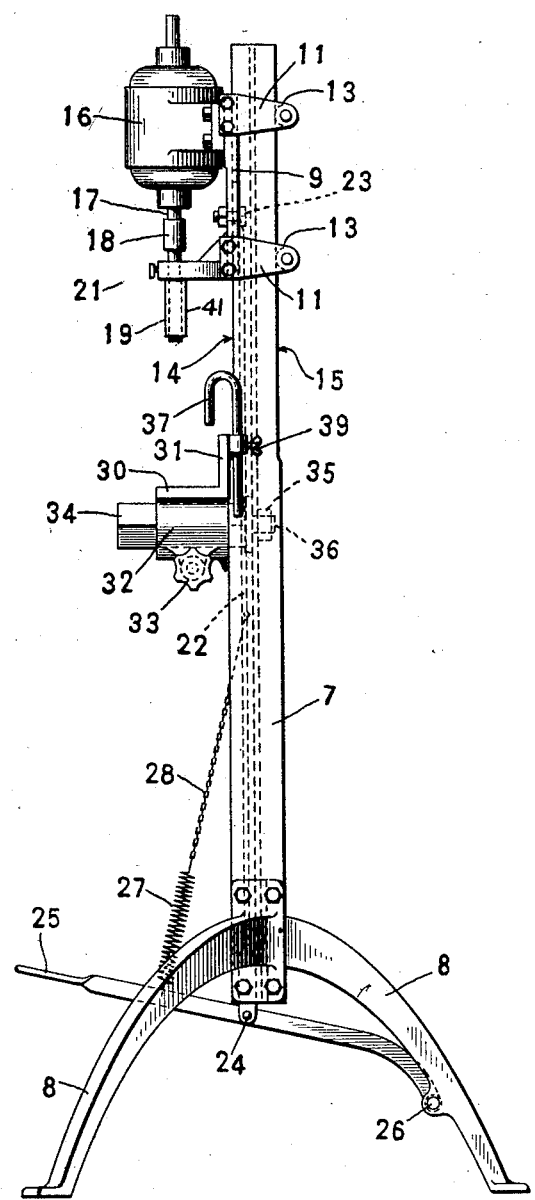
Figure 2 is a side elevation of the same.

The spring connection described, acting through the pedal and link, supports the drill carriage normally elevated, as shown in Figures 1 and 2, but pressure on the pedal will lower this carriage to bring the drill into operative engagement with the work. As soon as pressure on the pedal is released, the spring immediately lifts the carriage, carrying the drill free of the work.

The work is supported in the present disclosure upon a bed or shelf 30 of generally L-shaped cross section, having an upright positioning flange 31 at the back of the same, this work support having a split collar 32 adjustably clamped by a screw 33 upon the forwardly projecting supporting post 34. This post and the clamping sleeve are shown as of angular cross section so that the work table will not turn upon the same and the post is shown as secured to the web of the clamp in variously rotated positions by a nut 35 engaged on the extended stem 36 of the post and designed to have a clamping engagement with the rear face of the web.

The construction described enables the work table to be shifted forwardly or rearwardly beneath the drill and the table to be tilted to one side or the other to bring the work into various angular relations to the drill.

The table is shown equipped at the rear with vertically adjustable work clamps 37 having downwardly directed ends extending forwardly over the table, said clamps being secured in their holding sockets 38 by the clamp screws 39.

To take up for wear and provide for a close fitting sliding engagement of the carriage on the standard, the rollers 13 are shown as journaled eccentrically on the studs 40 by which they are secured in brackets 11 so that they may be shifted toward or away from the tracks over which they ride by slight rotary adjustments of these mounting studs. The studs are held in adjusted position by the nuts 43.

By releasing the hook bolt 23 and then engaging the same with the link 22 at different points in the length of said link, the carriage may be changed to different working elevations to accommodate the same to material of different widths or heights.

To aid in the angular adjustment of the table or work support, a scale 40' may be provide about the center of adjustment of the supporting bolt 34 and the sleeve 32 of the table may carry a pointer element to cooperate with said scale.

What is claimed is:

1. In a machine of the character disclosed, a frame comprising an upright I-beam structure, a carriage vertically slidable over the front flanges of said I-beam and having guide rollers riding over the rearward flanges of the I-beam, a drill head on said carriage, a stud projecting forwardly from the web of the I-beam beneath said drill head, a work table variously adjustable on said supporting stud and connections for operating the drill head carriage.

2. In a machine of the character disclosed, a frame comprising an upright I-beam structure, a carriage vertically slidable over the front flanges of said I-beam and having guide rollers riding over the rearward flanges of the I-beam, a drill head on said carriage, a stud projecting forwardly from the web of the I-beam beneath said drill head, a work table variously adjustable on said supporting stud and connections for operating the drill head carriage, including a pedal, a link engaged with said pedal and extending up between the flanges of the I-beam to the carriage and spring means acting on said connections to hold the carriage in a normally elevated position.

3. In a machine of the character disclosed, an I-beam structure, a drill head slidably confined to and guided by the front and rear edge flanges of said I-beam structure and an operating connection for said drill head disposed between the flanges of the I-beam.

4. In a machine of the character disclosed, an I-beam structure, a drill head slidably confined to and guided by the front and rear edge flanges of said I-beam structure, an operating connection for said drill head disposed between the flanges of the I-beam and a work table having a pivotal mounting on the web of the I-beam and a slidable adjustment toward and away from the flanges of the I-beam.

5. In a machine of the character disclosed, an I-beam structure, a drill head slidably confined to and guided by the front and rear edge flanges of said I-beam structure and an operating connection for said drill head disposed between the flanges of the I-beam, the drill head having eccentrically adjustable guide rollers engaging the flanges and regulatable to take up for wear of the parts.

6. In a machine of the character disclosed, a supporting column, a forwardly projecting stud pivotally mounted on said column, a work table slidably adjustable on said stud, a tool carriage vertically adjustable on the column above the work table, a tool operating motor mounted on said carriage and means for raising and lowering the tool carriage on the column.

7. In a machine of the character disclosed, an upright I-beam column, a carriage riding on the front flanges of said column and having guide rollers engaging the rearward flanges of said column, a motor mounted on said carriage, a tool carrying chuck operated thereby, a work table adjustably supported on the column beneath the tool carriage, means for yieldingly supporting the tool carriage upraised over the work table and manually operable means for lowering the carriage toward the work table.

8. In a machine of the character disclosed, an upright I-beam column, a carriage riding on the front flanges of said column and having guide rollers engaging the rearward flanges of said column, a motor mounted on said carriage, a tool carrying chuck operated thereby, a work table adjustably supported on the column beneath the tool carriage, means for yieldingly supporting the tool carriage upraised over the work table, manually operable means for lowering the carriage toward the work table, a forwardly extending lug on the carriage provided with a guide for the tool, a table having an upright guide flange at the back of the same and provided with a split angular collar, a clamp screw for said collar and a stud of angular cross section engaged with said collar and pivotally secured in the web of the column for enabling the adjustments of the table aforesaid.

9. A machine comprising an I-beam, a head slidably mounted on the I-beam, the head having guiding contact with the forward edges of the side flanges of the I-beam, and adjustable rollers carried by the head and engaging the rear edges of the side flanges.

10. A machine comprising a supporting column, a horizontal stud mounted on the column, said stud being rotatably adjustable, a work table slidably adjustable along said stud, and means for clamping the work table in adjusted position.

In testimony whereof I affix my signature.

RAYMOND E. DE WALT.